US012683736B2

(12) United States Patent
Sarkis et al.

(10) Patent No.: US 12,683,736 B2
(45) Date of Patent: *Jul. 14, 2026

(54) CHANNEL ESTIMATION FOR TWO-STAGE SIDELINK CONTROL USING SIDELINK DATA CHANNEL DMRS

(71) Applicant: QUALCOMM Incorporated, San Diego, CA (US)

(72) Inventors: Gabi Sarkis, San Diego, CA (US); Kapil Gulati, Belle Mead, NJ (US); Alexandros Manolakos, Escondido, CA (US); Shuanshuan Wu, San Diego, CA (US); Sudhir Kumar Baghel, Pleasanton, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/321,866

(22) Filed: May 23, 2023

(65) Prior Publication Data

US 2023/0299912 A1     Sep. 21, 2023

Related U.S. Application Data

(63) Continuation of application No. 17/062,020, filed on Oct. 2, 2020, now Pat. No. 11,700,095.

(30) Foreign Application Priority Data

Oct. 4, 2019     (GR) .............................. 20190100437

(51) Int. Cl.
*H04L 5/00*          (2006.01)
*H04L 5/02*          (2006.01)
(Continued)

(52) U.S. Cl.
CPC .......... *H04L 5/0048* (2013.01); *H04L 5/0023* (2013.01); *H04L 5/023* (2013.01); *H04W 72/1263* (2013.01); *H04W 72/20* (2023.01)

(58) Field of Classification Search
None
See application file for complete search history.

(56) References Cited

U.S. PATENT DOCUMENTS 10,412,773 B2     9/2019   Kim et al.
10,433,317 B2     10/2019  Park et al.
(Continued)

FOREIGN PATENT DOCUMENTS

CN          105634708 A     6/2016
CN          107733818 A     2/2018
(Continued)

OTHER PUBLICATIONS

Ericsson: "On 2-Stage PSCCH Design", 3GPP TSG-RAN WG1 Meeting #95, R1-1813648, 3rd Generation Partnership Project, Mobile Competence Centre, 650, Route Des Lucioles, F-06921 Sophia-Antipolis Cedex, France, vol. RAN WG1, No. Spokane, WA, US, Nov. 12, 2018-Nov. 16, 2018, Nov. 2, 2018, XP051479989, 4 Pages.

(Continued)

*Primary Examiner* — Phirin Sam
(74) *Attorney, Agent, or Firm* — Patterson + Sheridan, L.L.P.

(57)          ABSTRACT

Certain aspects of the present disclosure provide techniques for channel estimation for two-stage sidelink control using sidelink data channel demodulation reference signals (DMRS). A user equipment (UE) can transmit DMRS for the sidelink data channel. The UE may transmit the second stage of the sidelink control using antenna ports or a precoder used for the sidelink data channel. The receiving device may (Continued)

500

TRANSMIT, BY A USER EQUIPMENT (UE), ONE OR MORE DEMODULATION REFERENCE SIGNALS (DMRSs) FOR A SIDELINK DATA CHANNEL TRANSMISSION VIA A SET OF ONE OR MORE ANTENNA PORTS — 505

TRANSMIT, BY THE UE, A SECOND STAGE OF A TWO-STAGE SIDELINK CONTROL INFORMATION (SCI) TRANSMISSION USING ANTENNA PORTS FROM THE SET OF ANTENNA PORTS — 510 receive the DMRS, estimate the channel, and demodulate the second stage of the sidelink control based on the estimated channel. The receiving device may flexibly determine the DMRS to use for the estimation and demodulation.

26 Claims, 11 Drawing Sheets

(51) Int. Cl.
H04W 72/1263 (2023.01)
H04W 72/20 (2023.01)

(56) References Cited

U.S. PATENT DOCUMENTS

| | | | | |
|---|---|---|---|---|
| 2018/0062809 A1 | 3/2018 | Baghel et al. | | |
| 2018/0227886 A1* | 8/2018 | Chou | | H04B 7/0695 |
| 2018/0322623 A1* | 11/2018 | Memo | | G06N 3/09 |
| 2019/0108396 A1* | 4/2019 | Dal Mutto | | G06N 3/047 |
| 2020/0162133 A1* | 5/2020 | Harrison | | H04W 52/08 |
| 2020/0260472 A1* | 8/2020 | Ganesan | | H04W 4/46 |
| 2020/0304159 A1* | 9/2020 | Liao | | H04J 11/0036 |
| 2020/0396760 A1* | 12/2020 | Yi | | H04L 1/1812 |
| 2020/0404624 A1* | 12/2020 | Roth | | H04L 5/0044 |
| 2021/0007096 A1* | 1/2021 | Huang | | H04L 5/0055 |
| 2021/0067290 A1* | 3/2021 | Chen | | H04L 5/0033 |
| 2021/0075552 A1* | 3/2021 | Huang | | H04L 1/1854 |
| 2021/0083704 A1* | 3/2021 | Liao | | H04W 72/23 |
| 2021/0105055 A1* | 4/2021 | Chae | | H04L 5/0026 |
| 2021/0105119 A1 | 4/2021 | Sarkis et al. | | |
| 2022/0078782 A1* | 3/2022 | Zhao | | H04W 72/0446 |
| 2022/0104203 A1* | 3/2022 | Lin | | H04W 52/383 |
| 2022/0159674 A1 | 5/2022 | Deng et al. | | |
| 2022/0174682 A1 | 6/2022 | Li et al. | | |
| 2022/0217697 A1 | 7/2022 | Lee et al. | | |
| 2022/0263548 A1* | 8/2022 | Cao | | H04L 5/0037 |
| 2022/0272727 A1 | 8/2022 | Salim et al. | | |
| 2022/0303059 A1 | 9/2022 | Hahn et al. | | |
| 2022/0353846 A1* | 11/2022 | Wang | | H04W 72/0446 |
| 2024/0187164 A1* | 6/2024 | Chae | | H04L 5/0053 |
| 2024/0372592 A1* | 11/2024 | Chae | | H04L 5/0048 |
| 2025/0008521 A1* | 1/2025 | Zhao | | H04W 72/23 |
| 2025/0151050 A1* | 5/2025 | Salim | | H04L 5/0051 |

FOREIGN PATENT DOCUMENTS

| | | |
|---|---|---|
| CN | 112314006 A | 2/2021 |
| EP | 3128797 A1 | 2/2017 |
| TW | 201931879 A | 8/2019 |
| WO | 2017116108 A1 | 7/2017 |
| WO | 2020096693 A1 | 5/2020 |
| WO | 2020199211 A1 | 10/2020 |

OTHER PUBLICATIONS

International Preliminary Report on Patentability—PCT/US2020/054177—The International Bureau of WIPO—Geneva, Switzerland—Apr. 14, 2022.

International Search Report and Written Opinion—PCT/US2020/054177—ISA/EPO—Jan. 15, 2021.

Nasraoui L., et al., "Robust Neighbor Discovery through SideLink Demodulation Reference Signal for LTE ProSe Network", 2019 IEEE 30th Annual International Symposium on Personal, Indoor and Mobile Radio Communications (PIMRC), Sep. 1, 2019 (Sep. 1, 2019), 5 pages, XP055761571, DOI: 10.1109/PIMRC.2019.8904158, ISBN: 978-1-5386-8110-7, Abstract, Section I, Section II.A, Section II.B, Section III (first 9 lines of the introduction), Section III.A (first 12 lines), Section V.

Taiwan Search Report—TW109134447—TIPO—Mar. 26, 2024.

Nokia, et al., "Discussion of Physical Layer Structure for Sidelink", 3GPP TSG RAN WG1 #98, R1-1908282, 3rd Generation Partnership Project, Mobile Competence Centre, 650, Route Des Lucioles, F-06921 Sophia-Antipolis Cedex, France, vol. RAN WG1 , No. Prague, CZ, Aug. 26, 2019-Aug. 30, 2019, Aug. 17, 2019, 19 Pages, XP051764895.

Certified Copy of CN201910296855.6 Filed on Apr. 3, 2019, 21 pages.

Interdigital Inc: "On Physical Layer Structure for NR V2X Sidelink", 3GPP TSG RAN WG1 #98, R1-1909028, Prague, CZ, Aug. 26-30, 2019, 15 pages.

LG Electronics: "Discussion on Physical Layer Structure for NR Sidelink", 3GPP TSG RAN WG1 #98, R1-1908900, Prague, CZ, Aug. 26-30, 2019, 34 pages.

LG Electronics: "Summary of RAN1 Agreements/working Assumptions in WI 5G V2X with NR Sidelink", 3GPP TSG RAN WG1 #98, R1-1909921, Prague, CZ, Aug. 26 30, 2019, pp. 1-15, Sep. 23, 2019.

Vivo: "Physical Layer Structure for NR Sidelink", R1-1908148, 3GPP TSG RAN WG1 #98 Meeting Prague, CZ, Aug. 26-30, 2019, pp. 1-21.

European Search Report—EP26152575—Search Authority—The Hague—Apr. 1, 2026.

* cited by examiner

500

| TRANSMIT, BY A USER EQUIPMENT (UE), ONE OR MORE DEMODULATION REFERENCE SIGNALS (DMRSs) FOR A SIDELINK DATA CHANNEL TRANSMISSION VIA A SET OF ONE OR MORE ANTENNA PORTS | 505 |

| TRANSMIT, BY THE UE, A SECOND STAGE OF A TWO-STAGE SIDELINK CONTROL INFORMATION (SCI) TRANSMISSION USING ANTENNA PORTS FROM THE SET OF ANTENNA PORTS | 510 |

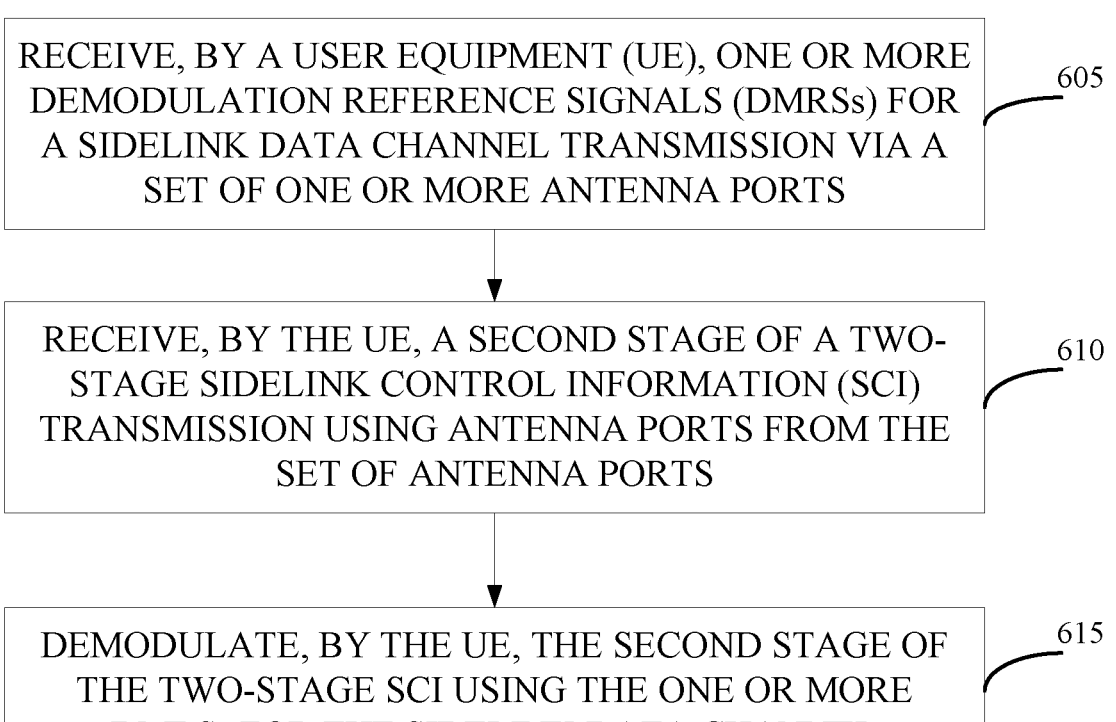

RECEIVE, BY A USER EQUIPMENT (UE), ONE OR MORE DEMODULATION REFERENCE SIGNALS (DMRSs) FOR A SIDELINK DATA CHANNEL TRANSMISSION VIA A SET OF ONE OR MORE ANTENNA PORTS — 605

RECEIVE, BY THE UE, A SECOND STAGE OF A TWO-STAGE SIDELINK CONTROL INFORMATION (SCI) TRANSMISSION USING ANTENNA PORTS FROM THE SET OF ANTENNA PORTS — 610

DEMODULATE, BY THE UE, THE SECOND STAGE OF THE TWO-STAGE SCI USING THE ONE OR MORE DMRSs FOR THE SIDELINK DATA CHANNEL — 615

FIG. 6

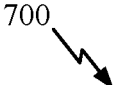
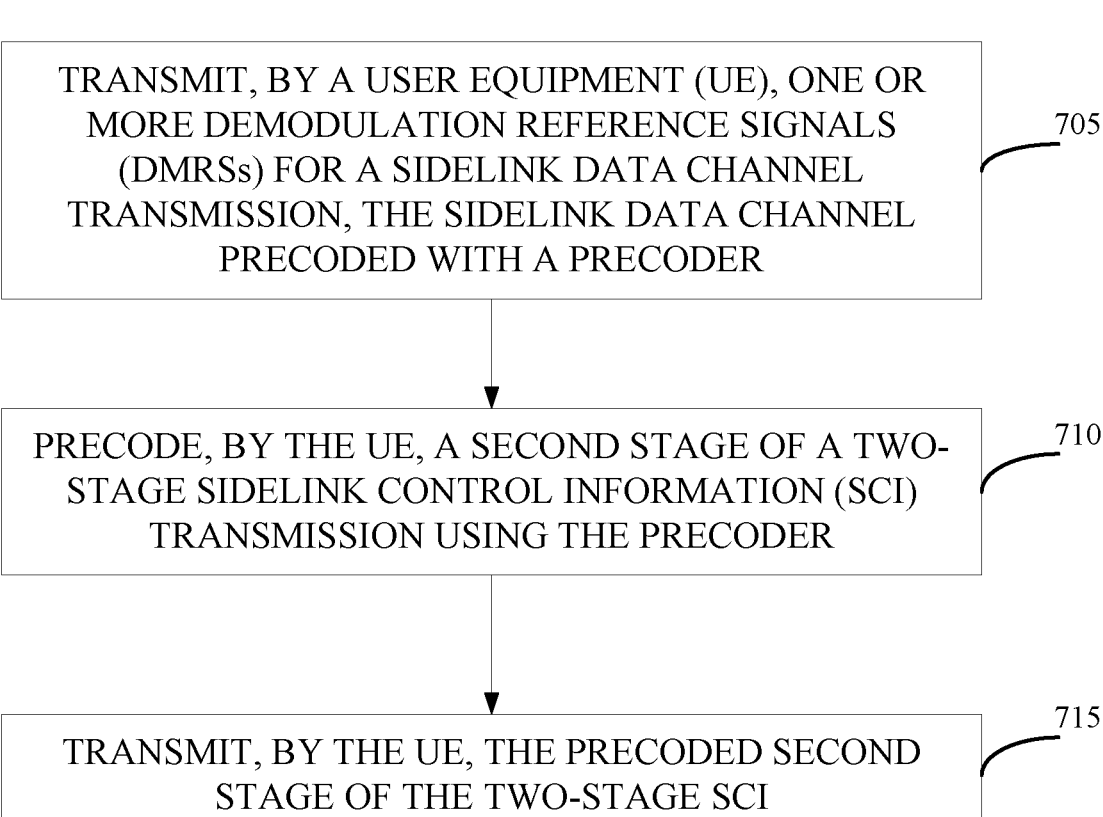
TRANSMIT, BY A USER EQUIPMENT (UE), ONE OR MORE DEMODULATION REFERENCE SIGNALS (DMRSs) FOR A SIDELINK DATA CHANNEL TRANSMISSION, THE SIDELINK DATA CHANNEL PRECODED WITH A PRECODER                    705
PRECODE, BY THE UE, A SECOND STAGE OF A TWO-STAGE SIDELINK CONTROL INFORMATION (SCI) TRANSMISSION USING THE PRECODER                    710
TRANSMIT, BY THE UE, THE PRECODED SECOND STAGE OF THE TWO-STAGE SCI                    715
FIG. 7

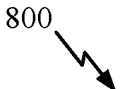
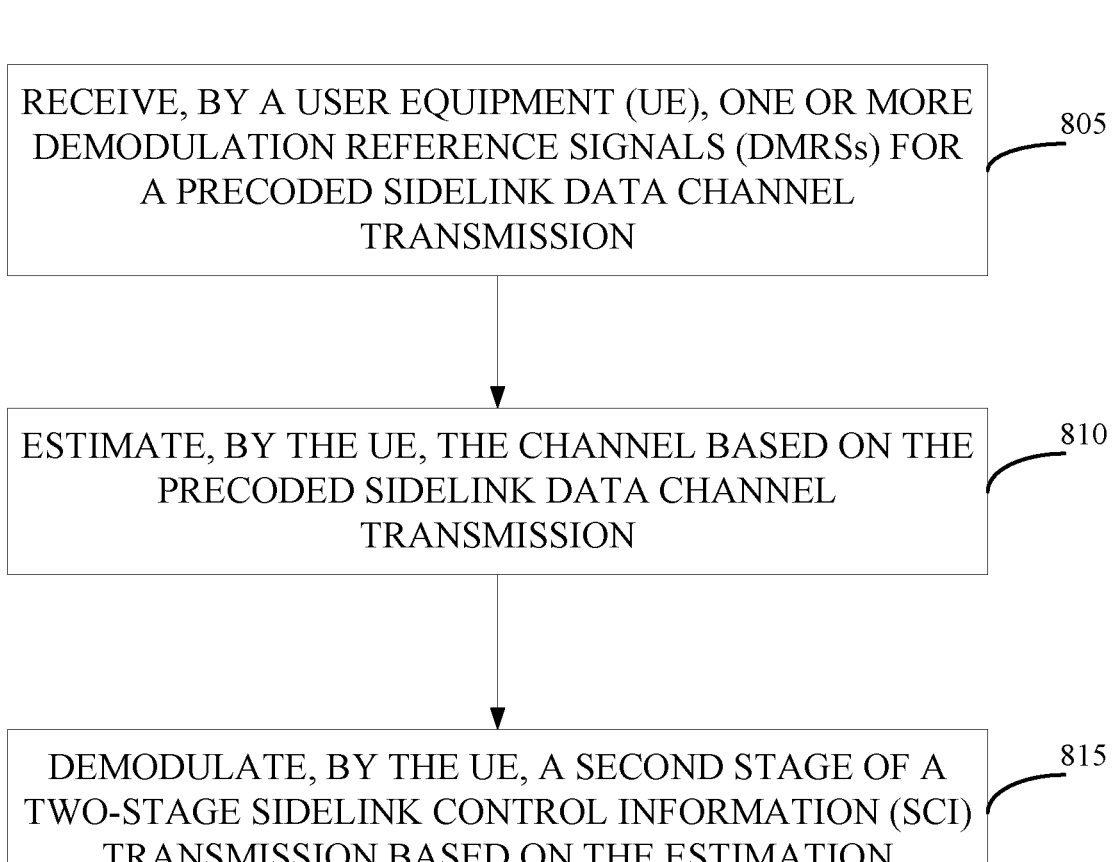
RECEIVE, BY A USER EQUIPMENT (UE), ONE OR MORE DEMODULATION REFERENCE SIGNALS (DMRSs) FOR A PRECODED SIDELINK DATA CHANNEL TRANSMISSION          805
ESTIMATE, BY THE UE, THE CHANNEL BASED ON THE PRECODED SIDELINK DATA CHANNEL TRANSMISSION          810
DEMODULATE, BY THE UE, A SECOND STAGE OF A TWO-STAGE SIDELINK CONTROL INFORMATION (SCI) TRANSMISSION BASED ON THE ESTIMATION          815
FIG. 8

900

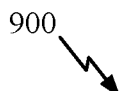

RECEIVE, BY A USER EQUIPMENT (UE), ONE OR MORE DEMODULATION REFERENCE SIGNALS (DMRSs) FOR A SIDELINK DATA CHANNEL TRANSMISSION IN A SLOT VIA A SET OF ONE OR MORE ANTENNA PORTS — 905

FLEXIBLY DETERMINE, BY THE UE, DMRSs OF THE ONE OR MORE DMRSs TO USE FOR DEMODULATING A SECOND STAGE OF A TWO-STAGE SIDELINK CONTROL INFORMATION (SCI) TRANSMISSION — 910

DEMODULATE, BY THE UE, THE SECOND STAGE OF THE TWO-STAGE SCI USING THE DETERMINED DMRSs FOR THE SIDELINK DATA CHANNEL — 915

FIG. 9

CHANNEL ESTIMATION FOR TWO-STAGE SIDELINK CONTROL USING SIDELINK DATA CHANNEL DMRS

CROSS-REFERENCE TO RELATED APPLICATIONS

This application is a continuation of U.S. patent application Ser. No. 17/062,020, filed Oct. 2, 2020, which claims benefit of and priority to Greece Patent Application Serial No. 20190100437, entitled "Channel Estimation for Two-Stage Sidelink Control Using Sidelink Data Channel DMRS," filed Oct. 4, 2019, and assigned to the assignee hereof, the contents of each is hereby incorporated by reference in its entirety.

BACKGROUND

Field of the Disclosure

Aspects of the present disclosure relate to wireless communications, and more particularly, to techniques for channel estimation for two-stage sidelink control using sidelink data channel demodulation reference signals (DMRS s).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the long term evolution (LTE) mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved sidelink feedback transmission in resource pool.

One or more innovative aspects of the subject matter described in this disclosure can be implemented in a method for wireless communication by a user equipment (UE). The method generally includes receiving one or more demodulation reference signals (DMRSs) for a sidelink data channel transmission via a set of one or more antenna ports. The method generally includes receiving a second stage of a two-stage sidelink control information (SCI) transmission using antenna ports from the set of antenna ports. The method generally includes demodulating the second stage of the two-stage SCI using the one or more DMRSs for the sidelink data channel.

One or more innovative aspects of the subject matter described in this disclosure can be implemented in a method for wireless communication by a UE. The method generally includes receiving one or more DMRSs for a precoded sidelink data channel transmission. The method generally includes estimating the channel based on the precoded sidelink data channel transmission. The method generally includes demodulating a second stage of a two-stage SCI transmission based on the estimation.

One or more innovative aspects of the subject matter described in this disclosure can be implemented in a method for wireless communication by a UE. The method generally includes receiving one or more DMRSs for a sidelink data channel transmission in a slot via a set of one or more antenna ports. The method generally includes flexibly determining DMRSs of the one or more DMRSs to use for demodulating a second stage of a two-stage SCI transmission. The method generally includes demodulating the second stage of the two-stage SCI using the determined DMRSs for the sidelink data channel.

One or more innovative aspects of the subject matter described in this disclosure can be implemented in a method for wireless communication by a UE. The method generally includes transmitting one or more DMRSs for a sidelink data channel transmission via a set of one or more antenna ports. The method generally includes transmitting a second stage of a two-stage SCI transmission using antenna ports from the set of antenna ports.

One or more innovative aspects of the subject matter described in this disclosure can be implemented in a method for wireless communication by a UE. The method generally includes transmitting one or more DMRSs for a sidelink data channel transmission, the sidelink data channel precoded with a precoder. The method generally includes precoding a second stage of a two-stage SCI transmission using the precoder. The method generally includes transmitting the precoded second stage of the two-stage SCI.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 is a flow diagram illustrating example operations by a UE for second stage SCI demodulation with shared DMRS ports, in accordance with certain aspects of the present disclosure.

FIG. 7 is a flow diagram illustrating example operations by a UE for second stage SCI transmission with shared sidelink data channel precoder, in accordance with certain aspects of the present disclosure.

FIG. 8 is a flow diagram illustrating example operations by a UE for second stage SCI demodulation with shared sidelink data channel precoder, in accordance with certain aspects of the present disclosure.

FIG. 9 is a flow diagram illustrating example operations by a UE for flexible DMRS determination for second stage SCI demodulation, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
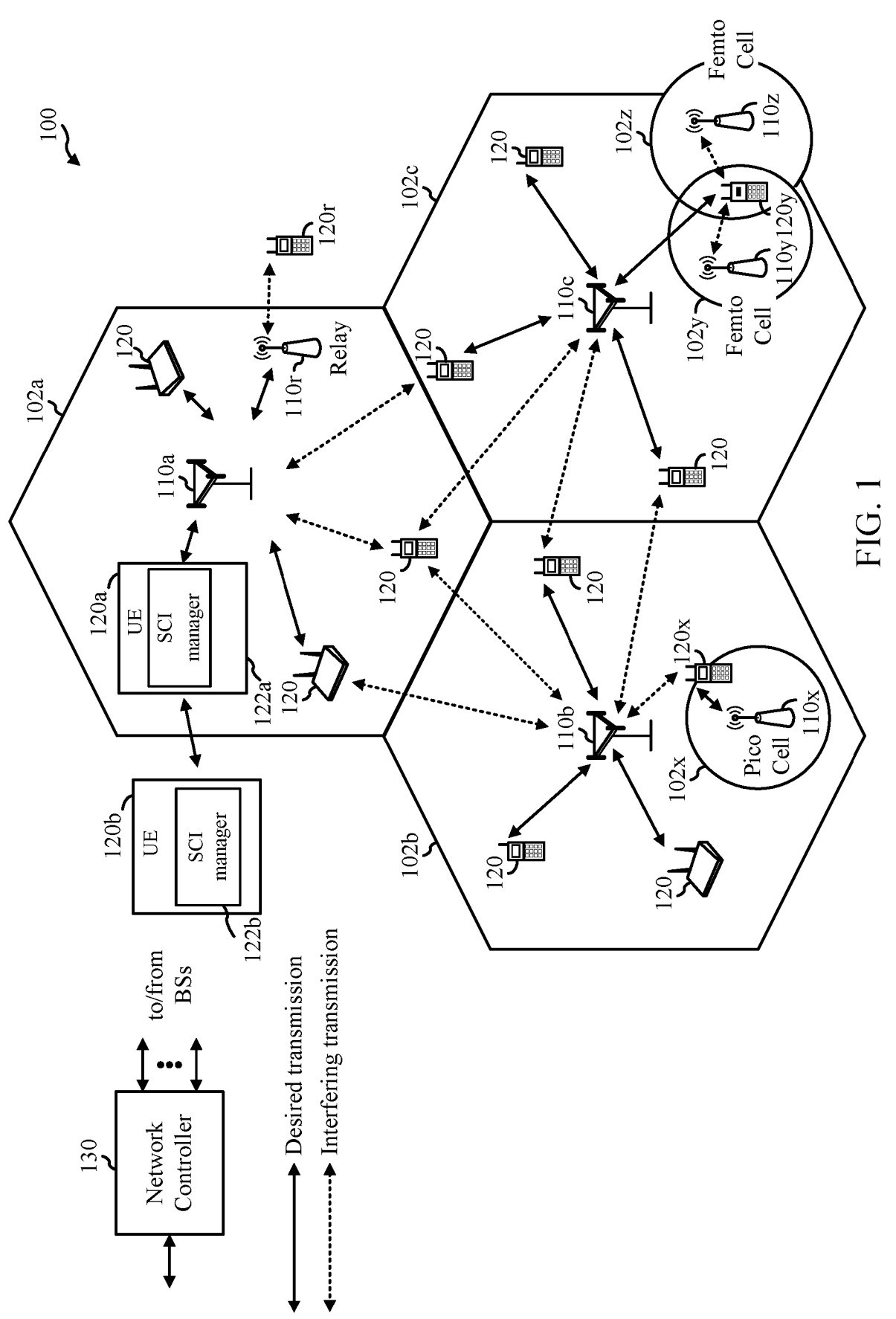
FIG. 1 is a block diagram conceptually illustrating an example telecommunications system, in accordance with certain aspects of the present disclosure.

Aspects of the present disclosure provide apparatus, methods, processing systems, and computer readable mediums for channel estimation for two-stage sidelink control using sidelink data channel demodulation reference signals (DMRS). Generally, as discussed in further detail below, two-stage sidelink control may include a first stage and a second stage, where the second stage can be decoded (e.g., using a DMRS) to determine whether the sidelink control transmission is intended for a specific receiving device. As will be described, the techniques presented herein allow demodulation of the second stage of a two stage sidelink control information (SCI) using the DMRS of the physical sidelink shared channel (PSSCH), even when the SCI and PSSCH have a different number of layers (e.g., when the SCI and other information on the PSSCH are transmitted using different numbers of layers).

The following description provides examples of channel estimation for two-stage sidelink control using sidelink data channel DMRS that may be used for sidelink in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Certain wireless networks utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

5G NR may utilize OFDM with a cyclic prefix (CP) on the uplink and downlink and include support for half-duplex operation using time division duplexing (TDD). A subframe can be 1 ms, but the basic transmission time interval (TTI) may be referred to as a slot. A subframe contains a variable number of slots (e.g., 1, 2, 4, 8, 16, . . . slots) depending on the subcarrier spacing (SCS). The NR resource block (RB) may be 12 consecutive frequency subcarriers. NR may support a base SCS of 15 KHz and other subcarrier spacing may be defined with respect to the base SCS, for example, 30 kHz, 60 kHz, 120 kHz, 240 kHz, etc. The symbol and slot lengths scale with the SCS. The CP length also depends on the SCS. 5G NR may also support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for sidelink communications. As shown in FIG. 1, the UE 110a includes a SCI manager 122a and the UE 120b includes a SCI manager 122b. The SCI manager 122a and/or the SCI manager 122b may be configured to transmit and/or receive/demodulate a two-stage SCI, in accordance with aspects of the present disclosure. As discussed in more detail below, the SCI manager 122a and/or the SCI manager 122b may transmit/demodulate a second stage of the two-stage SCI using a shared DMRS port or shared precoder. As also discussed in more detail below, the SCI manager 122a and/or the SCI manager 122b may flexibly determine the DMRS used to demodulate the second stage of the two-stage SCI.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
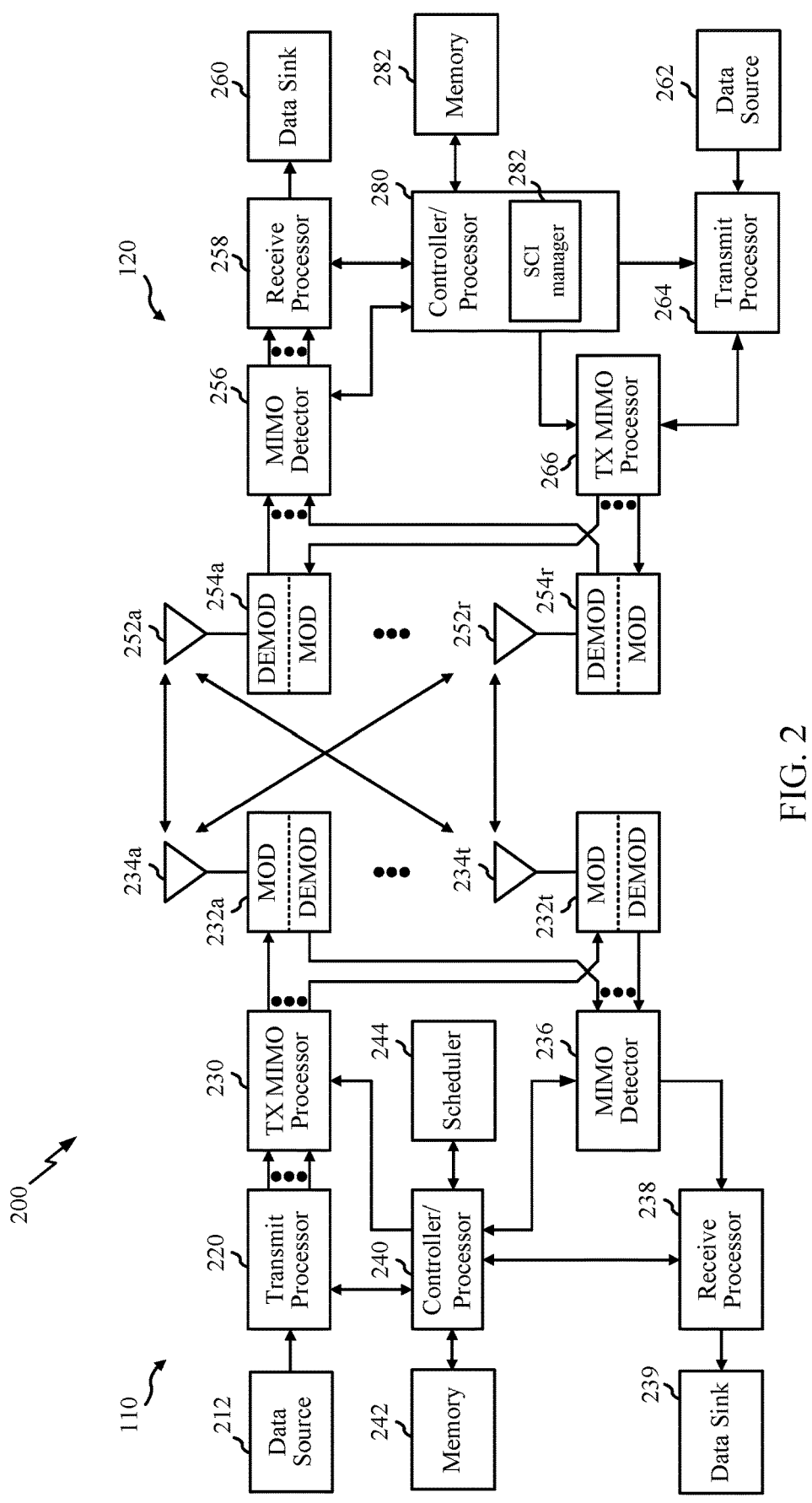
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1, which may be similar components in the UE 120b), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a BS may transmit a MAC CE to a UE to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 280 of the UE 120a has a SCI manager 222 that may be configured for channel estimation for two-stage SCI using sidelink data channel DMRS, in accordance with aspects of the present disclosure. Although shown at the controller/processor, other components of the UE 120a may be used to perform the operations described herein.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figures 3A, 3B:
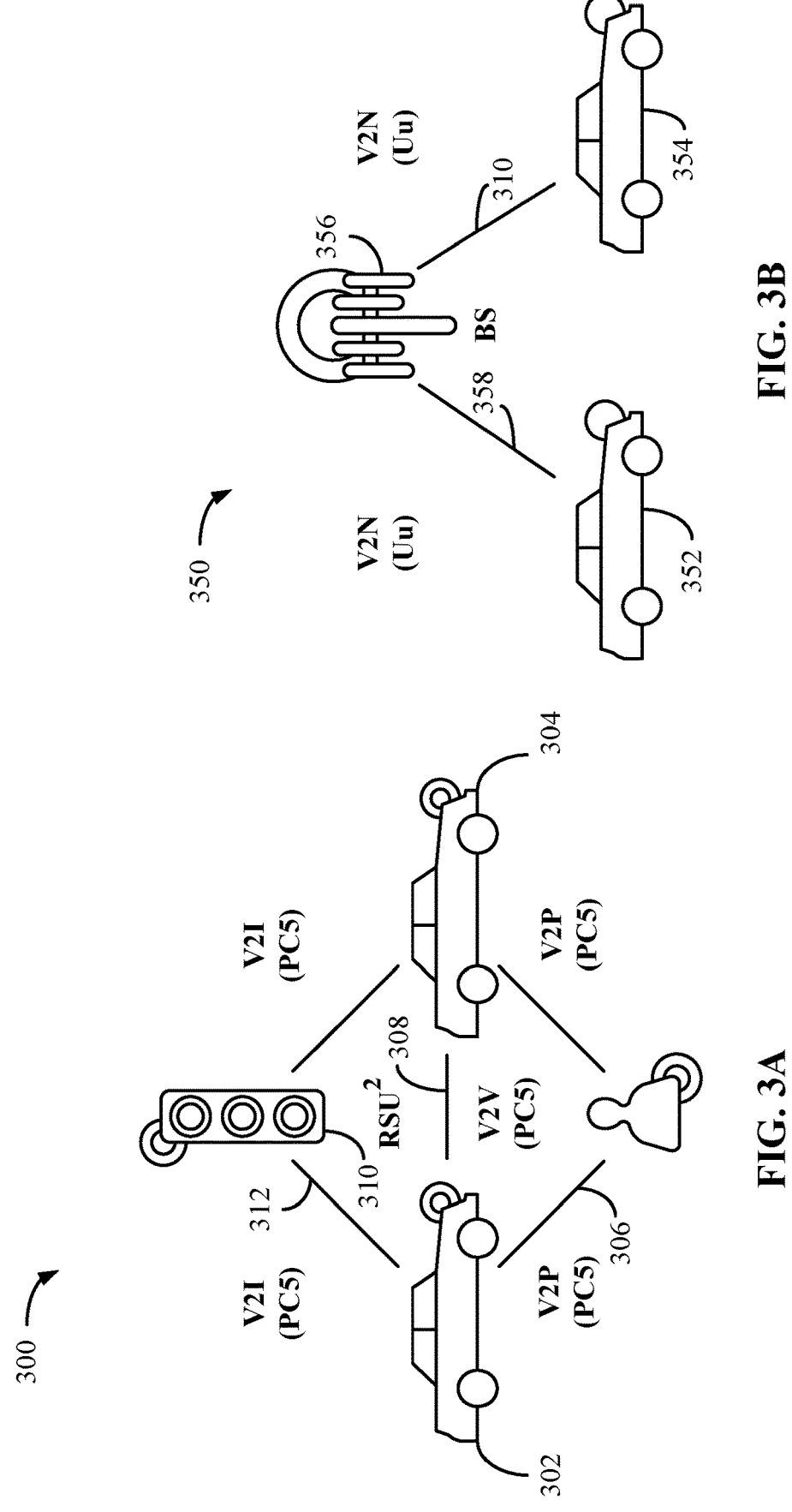
FIG. 3A and FIG. 3B show diagrammatic representations of example vehicle to everything (V2X) systems, in accordance with certain aspects of the present disclosure.

FIG. 3A and FIG. 3B show diagrammatic representations of example V2X systems, in accordance with some aspects of the present disclosure. For example, the vehicles shown in FIG. 3A and FIG. 3B may communicate via sidelink channels and may perform sidelink CSI reporting as described herein.

The V2X systems, provided in FIG. 3A and FIG. 3B provide two complementary transmission modes. A first transmission mode, shown by way of example in FIG. 3A, involves direct communications (for example, also referred to as sidelink communications) between participants (e.g., between different UEs) in proximity to one another in a local area. Generally, this first transmission mode may allow participants to communicate without communicating through (e.g., sending transmissions to and/or receiving transmissions from) a network entity, such as a gNodeB or base station. A second transmission mode, shown by way of example in FIG. 3B, involves network communications through a network, which may be implemented over a Uu interface (for example, a wireless communication interface between a radio access network (RAN) and a UE).

Referring to FIG. 3A, a V2X system 300 (for example, including vehicle to vehicle (V2V) communications) is illustrated with two vehicles 302, 304. The first transmission mode allows for direct communication between different participants in a given geographic location. As illustrated, a vehicle can have a wireless communication link 306 with an individual (V2P) (for example, via a UE) through a PC5 interface. Communications between the vehicles 302 and 304 may also occur through a PC5 interface 308. In a like manner, communication may occur from a vehicle 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a vehicle 352 and a vehicle 354 through a network entity 356. These network communications may occur through discrete nodes, such as a base station (for example, an eNB or gNB), that sends and receives information to and from (for example, relays information between) vehicles 352, 354. The network communications through vehicle to network (V2N) links 358 and 310 may be used, for example, for long range communications between vehicles, such as for communicating the presence of a car accident a distance ahead along a road or highway. Other types of communications may be sent by the node to vehicles, such as traffic flow conditions, road hazard warnings, environmental/ weather reports, and service station availability, among other examples. Such data can be obtained from cloud-based sharing services.

Example Two-Stage Sidelink Control Information (SCI)

As mentioned above, aspects of the present disclosure relate to techniques for channel estimation for a two-stage sidelink control information (SCI) using sidelink data channel demodulation reference signals (DMRS).

In certain systems, such as NR systems (e.g., Release 16 NR), a two-stage SCI is transmitted between user equipment (UEs) in sidelink communications. The two-stage SCI may include a first stage (referred to as SCI-1) and a second stage (referred to as SCI-2).

The SCI-1 may include information regarding resource availability, such as resource reservation and resource allocation information, and information for decoding the SCI-2. The SCI-2 may include at least information for decoding data and information for determining the intended recipient of the transmission. In some aspects, to allow for receiving devices to determine the intended recipient of the two-stage SCI, the SCI-2 may be modulated using a DMRS associated with a specific receiving device. That specific receiving device may thus be able to successfully demodulate the SCI-2 and determine that it is the intended recipient of the two-stage SCI by having been able to successfully demodulate the SCI-2; other receiving devices, in contrast, may not be able to demodulate the SCI-2 and may thus determine that they are not the intended recipient of the two-stage SCI.

Figure 4:
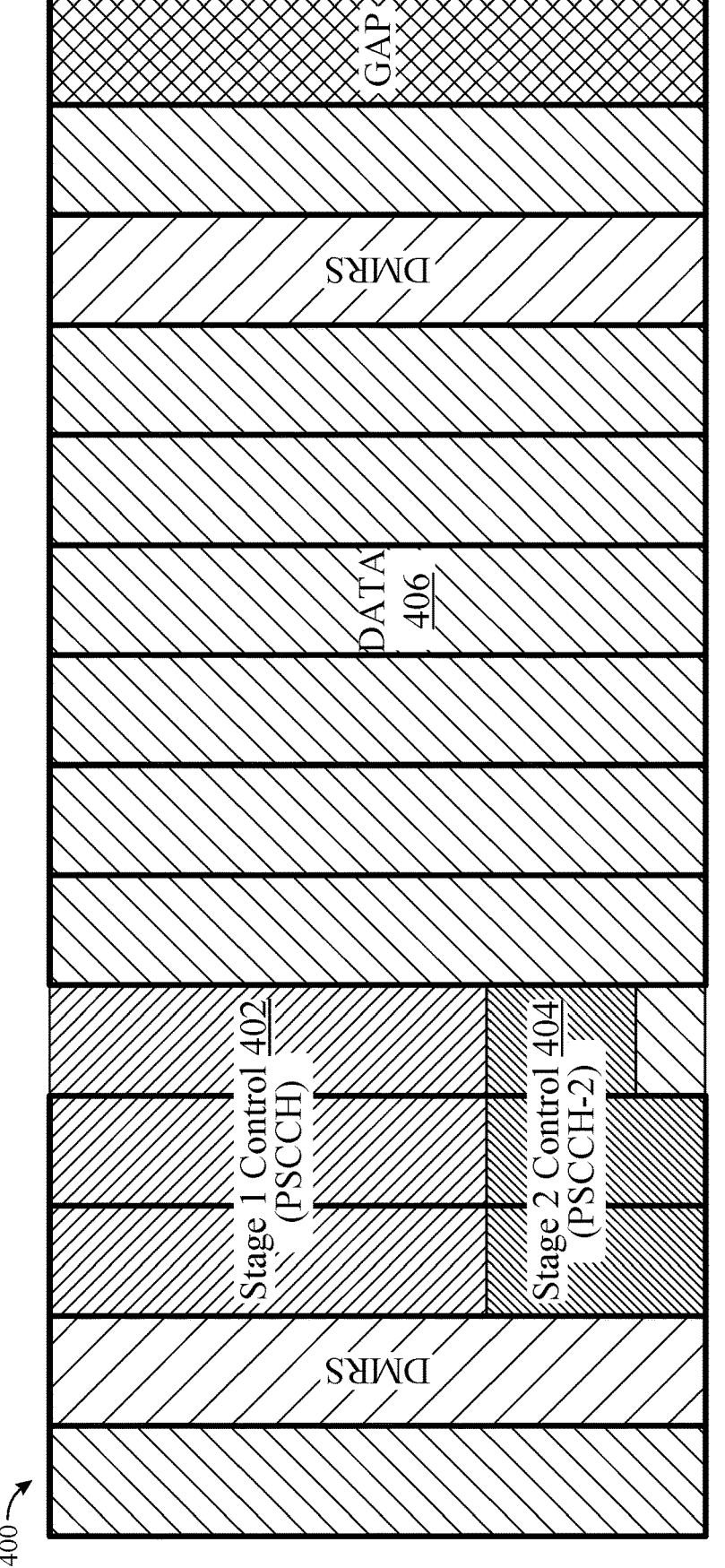
FIG. 4 is a diagram illustrating example sidelink data demodulation reference signal (DMRS) and two-stage sidelink control information (SCI) transmission in a slot, in accordance with certain aspects of the present disclosure.

FIG. 4 is a diagram illustrating example sidelink data channel DMRS and two-stage SCI transmission in a slot 400, in accordance with certain aspects of the present disclosure. In some examples, the Stage 1 Control 402 (e.g., SCI-1 in a two-stage SCI transmission) is transmitted over the physical sidelink control channel (PSCCH), as shown in FIG. 4. In some examples, the Stage 2 Control 404 (e.g., SCI-2 in the two-stage SCI transmission) may be transmitted over a second PSCCH, as shown in FIG. 4. In some examples, however, the SCI-2 may be transmitted (e.g., piggybacked) on the PSSCH (not shown). Generally, in piggybacking the SCI-2 transmission on the PSSCH, the SCI-2 transmission and other transmissions, such as data transmissions on the PSSCH, may be multiplexed for transmission using a same channel.

According to certain aspects, DMRS for the sidelink data channel (e.g., the PSSCH) is used to demodulate the SCI-2. As discussed, DMRSs may be associated with specific receiving devices, and the DMRS for the sidelink channel may be used to modulate the SCI-2 at the transmitting device. Recipients of the SCI-2 may use their own DMRSs to attempt to demodulate the SCI-2, and the device that successfully demodulates the SCI-2 (e.g., using the DMRS associated with that device) may determine that the SCI transmission is intended for that device. In some aspects, the PSSCH DMRS may also be used to perform channel estimation for the SCI-2.

In some examples, the PSCCH may use 1 layer (e.g., be transmitted using a single data stream). However, the PSSCH can be transmitted using more than 1 layer (e.g., be transmitted using one or multiple data streams). Thus, the sidelink control channel (e.g., a channel on which SCI-1 is transmitted) may use 1 layer and the SCI-2 may use one or multiple layers (e.g., if the SCI-2 is transmitted on the PSSCH).

Accordingly, techniques and apparatus are desirable for demodulating the second stage of the two-part SCI (e.g., the SCI-2) using the data sidelink channel DMRS, for example, even when the second stage of the two-part SCI and the data sidelink channel use different numbers of layers.

Example Channel Estimation for Two-Stage Sidelink Control Using Sidelink Data Channel DMRS As discussed above (e.g., with respect to FIG. 4), sidelink data channel demodulation reference signals (DMRS) can be used for channel estimation for a two-stage sidelink control. The second stage (SCI-2) of the two-stage sidelink control information can be demodulated based on the physical sidelink shared channel (PSSCH) DMRS (e.g., based on channel estimation performed using the physical sidelink shared channel (PSSCH) DMRS).

According to certain aspects, the SCI-2 and the PSSCH may share one or more antenna ports. For example, the SCI-2 may be transmitted using a subset or all of the antenna ports used for the PSCCH. The SCI-2 may use only antenna ports from the set of antenna ports used for the PSSCH. Because the SCI-2 and the PSSCH may share one or more antenna ports, various properties of the channel on which the SCI-2 is transmitted and the PSSCH may be similar, and thus, channel estimation performed on one channel (e.g., using DMRSs transmitted on the PSSCH) may be representative of channel conditions on the other channel (e.g., the channel on which the SCI-2 is transmitted).

According to certain aspects, the PSSCH may be precoded. The precoder for the PSSCH may be known to both the transmitter and receiver of the PSSCH. In some examples, the user equipment (UE) that that transmits the PSSCH may provide an indication to the receiving UE of the precoder used for the PSSCH transmission. For example, the indication of the precoder used for the PSSCH transmission may be indicated to the receiving UE when a connection is established, in system information update messages, or in other control information that may be transmitted to the receiving UE (e.g., via one or both of the PSCCH or the PSSCH). The indication of the precoder used for the PSSCH transmission may be an implicit indication or an explicit indication. An implicit indication may, for example, indicate the precoder used for the PSSCH transmission based on some other information signaled to the receiving UE, while an explicit indication may, for example, include the precoder or an index identifying a specific pre-configured precoder that the receiving UE is to use. The receiving UE can use the PSSCH precoder to estimate the channel and demodulate the SCI-2.

According to certain aspects, the SCI-2 may be transmitted using the lowest index antenna ports of the PSSCH. That is, the SCI-2 may be transmitted using a subset of the antenna ports used for the PSSCH, which may allow for channel estimation performed in respect of the PSSCH to be representative of channel conditions for the channel on which the SCI-2 is transmitted. In some examples, when the PSSCH and the SCI-2 are transmitted using the number of layers (e.g., using the same number of data streams), then the UE may transmit the SCI-2 on the same antenna ports as those used for transmitting the PSSCH. For example, if a two-layer PSSCH is transmitted using ports X000 and X002, then the SCI-2 may also be transmitted using ports X000 and X002. In some examples, if the SCI-2 has fewer layers than the PSSCH, the SCI-2 may be transmitted using the lower indexed ports of the ports used for the PSSCH, as the higher layer ports may generally be unavailable for transmission of the SCI-2 (e.g., due to the codebook used to encode the SCI-2). For example, if the two-layer PSSCH is transmitted using ports X000 and X002, then a single-layer SCI-2 may be transmitted using the port X000 (e.g., the port having the lower index of the pair of ports X000 and X002).

According to certain aspects, if one of the antenna ports used for transmitting the PSSCH is a phase tracking reference signal (PT-RS) port, then the SCI-2 may be transmitted using the PT-RS port. Because PT-RSs may be transmitted in combination with DMRSs, transmitting the SCI-2 on the same port as the port used for transmitting PT-RSs may allow for channel estimation performed in respect of the PT-RS port to be representative of channel conditions for the channel (and antenna port(s)) used to transmit the SCI-2. In some cases, the SCI-2 may use fewer layers than the PSSCH. Regardless of the number of layers used by the SCI-2 and the PSSCH, the SCI-2 may be transmitted using the PT-RS port even if the PT-RS is not the port having the lowest index of the ports used for the PSSCH.

According to certain aspects, the UE may be configured with, or receive an indication of, the PSSCH DMRSs that the UE can use for demodulating the SCI-2. In some examples, the UE can flexibly determine the PSSCH DMRS s to use for demodulating the SCI-2. In some examples, the UE may use PSSCH DMRSs received before the start of the SCI-2 to demodulate the SCI-2. In some examples, the UE may use the PSSCH DMRSs received up to the end of the SCI-2 to demodulate the SCI-2. In some examples, the UE may use PSSCH DMRSs received up to the end of the slot to demodulate the SCI-2. In some examples, the UE uses all PSSCH DMRSs to demodulate the SCI-2. Processing time-lines may be independent of the PSSCH DMRSs used for demodulating SCI-2 or may change based on the PSSCH DMRSs used for the demodulation.

According to certain aspects, the number of layers for the SCI-2 can be configured or indicated (e.g., via explicit or implicit signaling) to the UE. In some examples, the number of layers for the SCI-2 may be explicitly signaled to the receiving UE. For example, the number of layers be explicitly signaled in the SCI-1. In some examples, the number of layers for the SCI-2 may be implicitly signaled. For example, the number of layers may be implicitly determined from DMRSs included in the SCI-1. In some examples, a scrambling seed for the DMRSs in the SCI-1 may indicate the number of layers for the SCI-2. Different scrambling seeds may, for example, indicate that a fixed number of layers is used for the PSSCH and the SCI-2, the same number of layers as used for the PSSCH, or a different number of layers. In some examples, the number of layers for the SCI-2 may be a configured (e.g., fixed) number of layers (e.g., such 1 layer). In some examples, the number of layers for the SCI-2 may be number of layers for the PSSCH. In such a case, both the transmitting and receiving UE may assume or otherwise expect the SCI-2 to use the same number of layers as used for the PSSCH. In some examples, the number layers for the SCI-2 may be configured or preconfigured.

According to certain aspects, the UE may transmit all channels on the same OFDM symbol with the same (or within a tolerance range or threshold) power spectral density (PSD), or transmit power so that channel conditions may remain the same for any data carried within that OFDM symbol and that a receiver may receive different channels carried on the same OFDM symbol at the same or similar received power level. In some examples, the UE may apply power control to ensure that the channels on the symbol are transmitted with the same PSD (or within the tolerance). The transmission of the channels on the OFDM symbol with the same power level or power levels within a tolerance range or threshold may be performed such that the channels transmitted on the same OFDM symbol are received, at a receiving device (e.g., a UE connected via a sidelink channel) at a same or similar (e.g., within a tolerance range or threshold) received power level. In some examples, the precoder may be selected in order to ensure that the same power level, or a power level within the tolerance range or threshold, is used to transmit the channels on the same OFDM symbol (e.g., to transmit PSCCH and PSSCH).

In some examples, the choice of precoder for the PSSCH may be restricted to allow for PSSCH and SCI-2 to be transmitted using different numbers of layers while allowing channel estimates performed in respect of DMRSs carried on the PSSCH to be applicable to SCI-2. For example, a restriction placed on the choice of precoder for PSSCH, and also used for SCI-2 may specify that the precoder cannot be [1 0; 0 1] if the number of layers of SCI-2 and PSSCH is not the same. In this example, a physical antenna may not be directly mapped to an antenna port.

FIGS. 5-9 are flow diagrams illustrating example operations 500-900 for wireless communication, in accordance with certain aspects of the present disclosure. The operations 500-900 may be performed, for example, by a sidelink UE (e.g., such as a UE 120a in the wireless communication network 100). Operations 500-900 may be implemented as software components that are executed and run on one or more processors (e.g., controller/processor 280 of FIG. 2). Further, the transmission and reception of signals by the UE in operations 500-900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Figure 5:
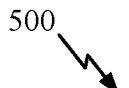
FIG. 5 is a flow diagram illustrating example operations by a UE for second stage SCI transmission with shared DMRS ports, in accordance with certain aspects of the present disclosure.

FIG. 5 is a flow diagram illustrating example operations 500 that may be performed by a UE for second stage SCI transmission with shared DMRS ports, in accordance with certain aspects of the present disclosure.

Operations 500 may begin, at 505, by transmitting one or more DMRS s for a sidelink data channel (e.g., PSSCH) transmission via a set of one or more antenna ports. In some aspects, the UE may transmit the one or more DMRSs for the sidelink data channel transmission to a second UE or other device connected to and in communication with the UE via a sidelink connection.

At 510, the UE transmits a second stage of a two-stage SCI (e.g., SCI-2) transmission using antenna ports from the set of antenna ports.

In some examples, the two-stage SCI includes a first stage of the SCI transmitted on a first PSCCH and carrying resource availability information and a second stage of the SCI transmitted on a second PSCCH or on the PSSCH (though using different time resources from the DMRSs transmitted for the sidelink data channel at 505) and carrying information to decode a data transmission. In some examples, the first stage SCI and the second stage of the SCI are frequency division multiplexed (FDM) in one or more symbols in a slot (e.g., interleaved), as discussed above with respect to FIG. 4. It should be noted that, at least in some aspects, the content of the first stage of the two-stage SCI may not be needed in order for the UE to decode the second stage of the two-stage SCI, as the second stage of the two-stage SCI may be modulated (and thus demodulated) based on specific DMRSs.

In some examples, the UE transmits the second stage using one or more antenna ports having the lowest indices of the set of antenna ports used for the sidelink data channel transmission. As discussed above, by transmitting the second stage of the two-stage SCI using antenna ports having the lowest indices of the set of antenna ports used for the sidelink data channel transmission, the sidelink data channel transmission and the second stage of the two-stage SCI may be transmitted using different numbers of layers while allowing for channel estimates performed in respect of the sidelink data channel to be representative of channel conditions for the channel used to transmit the second stage of the two-stage SCI. In some examples, the UE transmits the second stage using a PT-RS antenna port of the set of antenna ports used for the sidelink data channel transmission.

In some examples, the UE provides an explicit indication to a receiving device (e.g., a second UE or a device connected with the UE via a sidelink connection) in a first stage of the SCI of a number of layers of the second stage of the two-stage SCI. In some examples, the UE implicitly indicates, to the receiving device, a number of layers of the second stage of the two-stage SCI (e.g., through an indication of a scrambling seed associated with a specific number of layers used to transmit the second stage of the two-stage SCI).

In some examples, the UE transmits the second stage of the SCI using a single layer. In some examples, the UE transmits the second stage of the SCI using a number of layers equal to a number of layers used for the sidelink data channel transmission. In some examples, the UE transmits the second stage of the SCI using a configured number of layers (e.g., a number of layers that is configured a priori and indicated to the receiving UE).

In some examples, the UE transmits the first and second stages of the two-stage SCI at a same power level or at power levels within a configured tolerance so that the receiving UE receives the first and second stages of the two-stage SCI at the same received power level or a received power level that is within a threshold amount of power from each other. In some examples, the UE selects a precoder for the sidelink data channel and the second stage of the two-stage SCI to control the power level. In some examples, the precoder may not directly map an antenna port to a physical antenna when the sidelink data transmission and the second stage of the two-stage SCI are transmitted using a different number of layers.

FIG. 6 is a flow diagram illustrating example operations 600 that may be performed by a UE for second stage SCI demodulation with shared DMRS ports, in accordance with certain aspects of the present disclosure.

The operations 600 may begin, at 605, by receiving one or more DMRSs for a sidelink data channel (e.g., PSSCH) transmission via a set of one or more antenna ports.

At 610, the UE receives a second stage of a two-stage SCI transmission using antenna ports from the set of antenna ports.

In some examples, the two-stage SCI includes a first SCI transmitted on a first PSCCH and carrying resource availability information and a second SCI transmitted on a second PSCCH or on the PSSCH and carrying information to decode a data transmission. In some examples, the first SCI and the second SCI are FDMed in one or more symbols in a slot (e.g., interleaved).

In some examples, the UE receives the second stage using one or more antenna ports having the lowest indices of the set of antenna ports used for the sidelink data channel transmission. As discussed above, by transmitting the second stage of the two-stage SCI using antenna ports having the lowest indices of the set of antenna ports used for the sidelink data channel transmission, the sidelink data channel transmission and the second stage of the two-stage SCI may be transmitted using different numbers of layers while allowing for channel estimates performed in respect of the sidelink data channel to be representative of channel conditions for the channel used to transmit the second stage of the two-stage SCI. In some examples, the UE receives the second stage using a PT-RS antenna port of the set of antenna ports used for the sidelink data channel transmission.

In some examples, the UE receives an explicit indication in a first stage of the SCI of a number of layers of the second stage of the SCI. In some examples, the UE implicitly determines a number of layers of the second stage of the SCI based on a mapping (e.g., through an indication of a scrambling seed associated with a specific number of layers used to transmit the second stage of the two-stage SCI).

In some examples, the UE receives the second stage of the SCI using a single layer. In some examples, the UE receives the second stage of the SCI using a number of layers equal to a number of layers used for the sidelink data channel transmission. In some examples, the UE receives the second stage of the SCI using a configured number of layers. Generally, the UE may receive the second stage of the SCI using any number of layers that allows for channel estimations performed in respect of the PSSCH to be representative of channel conditions for the channel on which the second stage of the SCI is received.

In some examples, the sidelink data channel and the first and second stages of the two-stage SCI are received at a same power level or at power levels within a configured tolerance.

At 615, the UE demodulates the second stage of the two-stage SCI using the one or more DMRSs for the sidelink data channel. In some examples, the UE demodulates the second stage of the two-stage SCI using DMRSs received before receiving the start of the second stage of the two-stage SCI, which may allow for the second stage of the two-stage SCI to be demodulated quickly (e.g., after the second stage of the two-stage SCI is received). In some examples, the UE demodulates the second stage of the two-stage SCI using DMRSs received up to receiving the end of the second stage of the two-stage SCI, which may allow for the second stage of the two-stage SCI to be demodulated using additional information. In some examples, the UE demodulates the second stage of the two-stage SCI using DMRSs received up to the end of a slot in which the second stage of the two-stage SCI is received, which may allow for the second stage of the two-stage SCI to be demodulated using still further additional information. In some examples, the UE demodulates the second stage of the two-stage SCI using all DMRSs received for the PSSCH, which may allow for the second stage of the two-stage SCI to be demodulated using still further additional information. In some examples, the UE flexibly determines the DMRSs of the sidelink data channel to use for demodulating the second stage of the two-stage SCI, which may allow for the UE to balance, for example, the speed at which the second stage of the two-stage DMRS is demodulated with the amount of information used to demodulate the second stage of the two-stage SCI.

FIG. 7 is a flow diagram illustrating example operations 700 that may be performed by a UE for second stage SCI transmission with shared sidelink data channel precoder, in accordance with certain aspects of the present disclosure.

Operations 700 may begin, at 705, by transmitting one or more DMRSs for a sidelink data channel transmission, the sidelink data channel precoded with a precoder. The one or more DMRSs may be transmitted, for example, to a second UE or another device connected with the UE via a sidelink connection.

At 710, the UE precodes a second stage of a two-stage SCI transmission using the precoder. In some examples, the UE provides, to the receiving device, an indication or configuration of the precoder used for the sidelink data channel transmission. The indication or configuration of the precoder used for the sidelink data channel transmission may be carried in control information, such as information carried in one or both stages of the two-stage SCI, in information exchanged between UEs when a sidelink connection is established, in system update information, or the like.

At 715, the UE transmits the precoded second stage of the two-stage SCI. The UE may transmit the precoded second stage of the two-stage SCI to the second UE or other device connected with the UE via a sidelink connection. The UE may also transmit the first stage of the two-stage SCI to the second UE, as discussed above and illustrated in FIG. 4.

FIG. 8 is a flow diagram illustrating example operations 800 that may be performed by a UE for second stage SCI demodulation with shared sidelink data channel precoder, in accordance with certain aspects of the present disclosure.

At 805, the UE receives one or more DMRSs for a precoded sidelink data channel transmission. The UE may receive the one or more DMRSs from another UE connected with the UE via a sidelink connection.

At 810, the UE estimates the channel based on the precoded sidelink data channel transmission (e.g., based on the DMRSs for the precoded sidelink data channel transmission). The UE may receive an indication or configuration of the precoder used for the sidelink data channel transmission and estimate the channel based on the indicated or configured precoder.

At 815, the UE demodulates a second stage of a two-stage SCI transmission based on the estimation.

FIG. 9 is a flow diagram illustrating example operations 900 that may be performed by a UE for flexible DMRS determination for second stage SCI demodulation, in accordance with certain aspects of the present disclosure.

Operations 900 may begin, at 905, by receiving one or more DMRS s for a sidelink data channel transmission in a slot via a set of one or more antenna ports. The one or more DMRSs may be received from another UE connected with the UE via a sidelink connection.

At 910, the UE flexibly determines DMRSs of the one or more DMRSs to use for demodulating a second stage of a two-stage SCI transmission.

At 915, the UE demodulates the second stage of the two-stage SCI using the determined DMRSs for the sidelink data channel.

In some examples, the UE may determine that the second stage of the two-stage SCI is to be demodulated using DMRSs received before receiving the start of the second stage of the two-stage SCI, which may allow for the second stage of the two-stage SCI to be demodulated quickly (e.g., after the second stage of the two-stage SCI is received). In some examples, the UE may determine that the second stage of the two-stage SCI is to be demodulated using DMRSs received up to receiving the end of the second stage of the two-stage SCI. In some examples, the UE may determine that the second stage of the two-stage SCI may be demodulated using DMRSs received up to the end of a slot in which the second stage of the two-stage SCI is received. In some examples, the UE may determine that the second stage of the two-stage SCI is to be demodulated using all DMRSs received for the PSSCH. In each of these cases, the second stage of the two-stage SCI may be demodulated using additional information, which may allow for more accurate decoding of the two-stage SCI.

Figure 10:
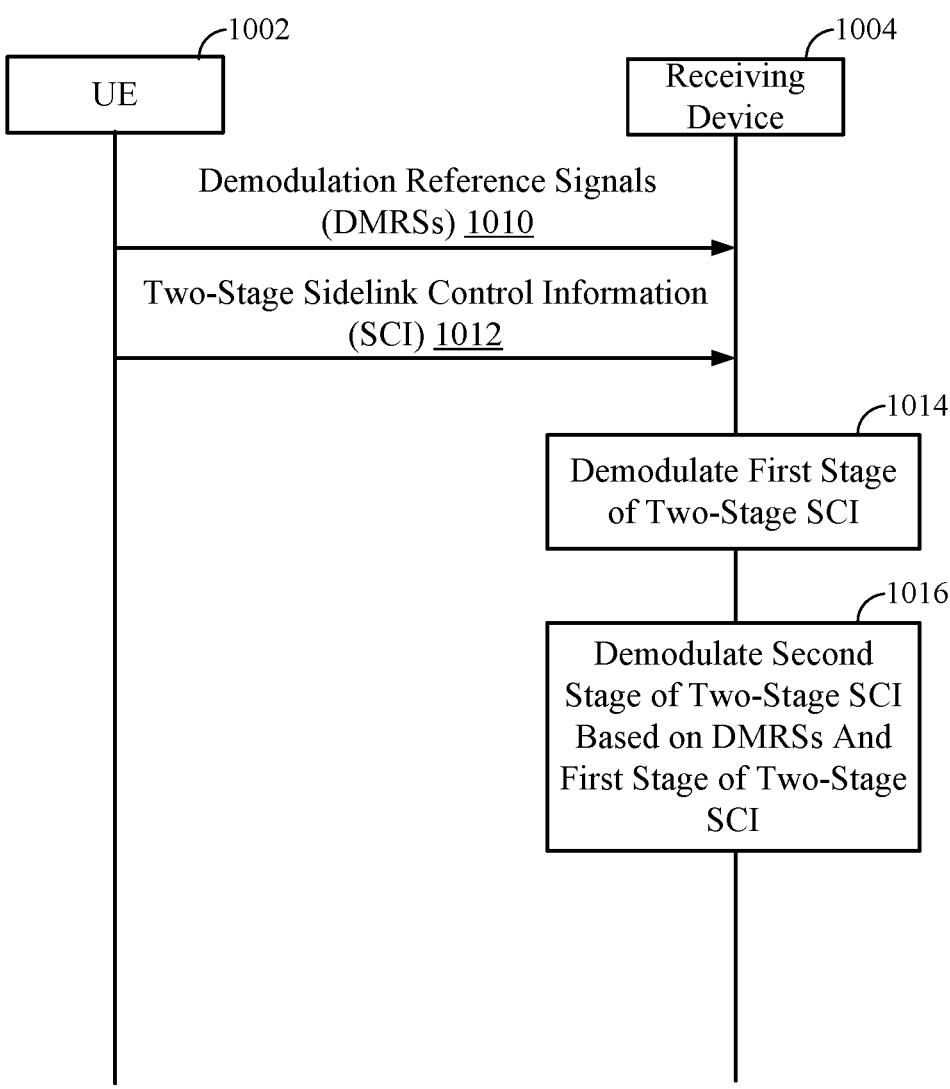
FIG. 10 is a message flow diagram illustrating an example of messages exchanged between a UE and a receiving device for DMRS and two-stage SCI transmission, in accordance with certain aspects of the present disclosure.

FIG. 10 is a message flow diagram illustrating example messages that may be exchanged between a UE 1002 and a receiving device 1004 to perform two-stage SCI transmissions using shared DMRS ports, in accordance with certain aspects of the present disclosure.

As illustrated, a UE 1002 may transmit one or more demodulation reference signals (DMRSs) 1010 to the receiving device 1004. The receiving device 1004 may be, for example, another UE or other device connected with UE 1002 via a sidelink connection. The DMRSs 1010 may be transmitted to the receiving device 1004 on a data (or shared) channel, such as a PSSCH, and may be used, as discussed above, by the receiving device to demodulate the second stage of an SCI.

After transmitting DMRSs 1010, the UE 1002 may transmit a two-stage SCI 1012 to the receiving device 1004. The first stage of the two-stage SCI may carry, for example, resource reservation and allocation information and information that may be used to decode the second stage of the two-stage SCI. The second stage of the two-stage SCI may carry, for example, information needed to decode a data payload carried on the data channel (e.g., the PSSCH). In some aspects, the UE 1002 may transmit the first stage and the second stage of the two-stage SCI 1012 to the receiving device 1004 using a same transmit power or transmit powers that are within a threshold difference such that the first stage and the second stage of the two-stage SCI are received at similar received power levels.

The receiving device 1004 may decode the first stage of the two-stage SCI at block 1014 and the second stage of the two-stage SCI at block 1016. The second stage of the two-stage SCI may be decoded at block 1016 based on resource information included in the first stage of the two-stage SCI and one or more of the DMRSs 1010 transmitted by the UE 1002. As discussed above, the receiving device 1004 may use information about antenna ports used to transmit the PSSCH, a precoder used for the PSSCH, a number of layers for second stage control and the PSSCH, or other information associated with the DMRSs to decode the second stage of the two-stage SCI.

Figure 11:
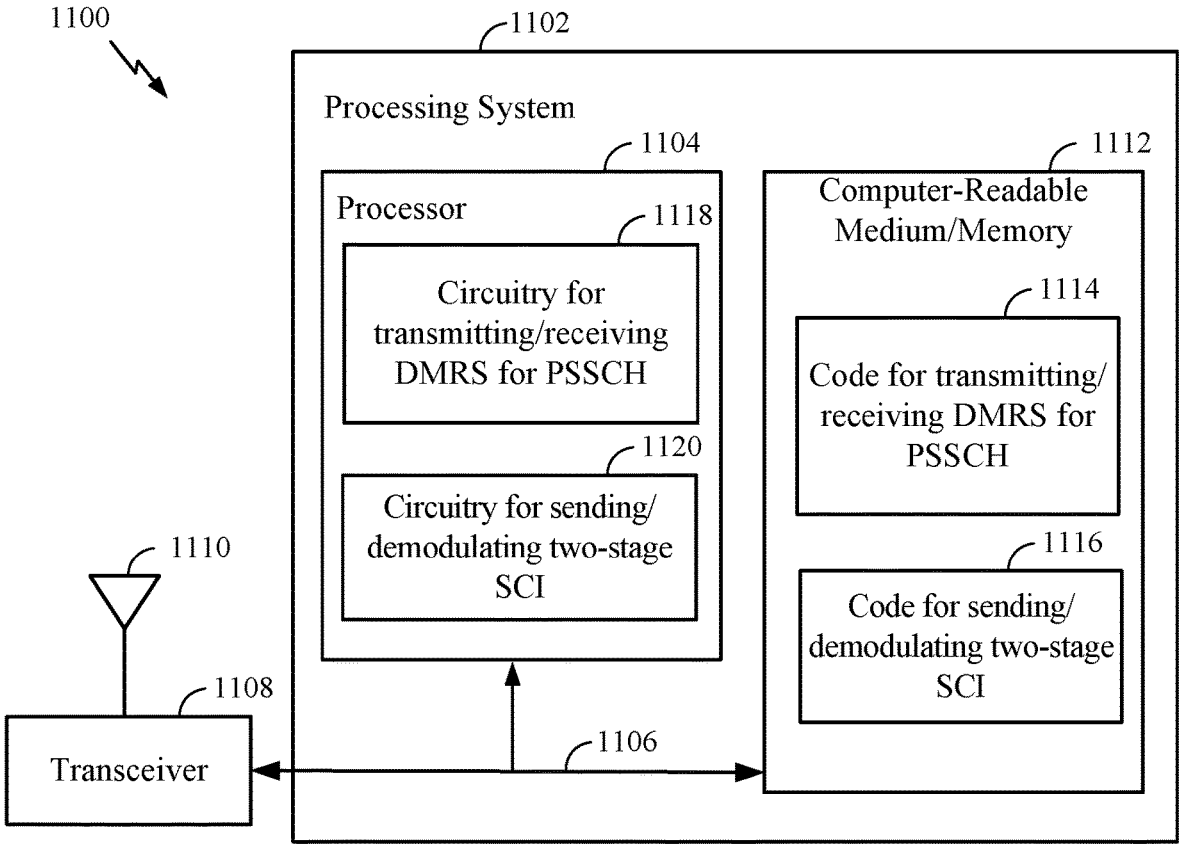
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 5-9. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 5-8, and/or FIG. 9, or other operations for performing the various techniques discussed herein for channel estimation for sidelink control using sidelink data channel DMRS. In certain aspects, computer-readable medium/memory 1112 stores code 1114 for transmitting and/or receiving DMRS for PSSCH; and code 1116 for sending and/or demodulating the second stage of two-stage SCI using the PSSCH DMRS, in accordance with aspects of the present disclosure. In certain aspects, the processor 1104 has circuitry configured to implement the code stored in the computer-readable medium/memory 1112. The processor 1104 includes circuitry 1118 for transmitting and/or receiving DMRS for PSSCH; and circuitry 1120 for sending and/or demodulating the second stage of two-stage SCI using the PSSCH DMRS, in accordance with aspects of the present disclosure.

Example Embodiments

Embodiment 1: A method for wireless communications by a user equipment (UE), comprising: transmitting one or more demodulation reference signals (DMRS) for a sidelink data channel transmission via a set of one or more antenna ports; and transmitting a second stage of a two-stage sidelink control information (SCI) transmission using antenna ports from the set of antenna ports.

Embodiment 2: The method of Embodiment 1, wherein: the sidelink data channel transmission comprises a first physical sidelink shared channel (PSSCH) transmission; and the two-stage SCI comprises a first SCI transmitted on a first physical sidelink control channel (PSCCH) and carrying resource availability information; and a second SCI transmitted on a second PSCCH or on the PSSCH and carrying information to decode a data transmission.

Embodiment 3: The method of Embodiment 2, wherein the first SCI and the second SCI are frequency division multiplexed (FDMed) in one or more symbols in a slot.

Embodiment 4: The method of any of Embodiments 1 to 3, wherein transmitting the second stage of the two-stage SCI comprises transmitting the second stage using one or more lowest index antenna ports of the set of antenna ports used for the sidelink data channel transmission.

Embodiment 5: The method of any of Embodiments 1 to 4, wherein transmitting the second stage of the two-stage SCI comprises transmitting the second stage using a phase tracking reference signal (PT-RS) antenna port of the set of antenna ports used for the sidelink data channel transmission.

Embodiment 6: The method of any of Embodiments 1 to 5, further comprising providing an explicit indication in a first stage of the SCI of a number of layers of the second stage of the SCI.

Embodiment 7: The method of any of Embodiments 1 to 6, further comprising implicitly indicating a number of layers of the second stage of the SCI.

Embodiment 8: The method of any of Embodiments 1 to 7, wherein transmitting the second stage of the SCI comprises transmitting the second stage of the SCI using a single layer.

Embodiment 9: The method of any of Embodiments 1 to 8, wherein transmitting the second stage of the SCI comprises transmitting the second stage of the SCI using a number of layers equal to a number of layers used for the sidelink data channel transmission.

Embodiment 10: The method of any of Embodiments 1 to 9, wherein transmitting the second stage of the SCI comprises transmitting the second stage of the SCI using a configured number of layers.

Embodiment 11: The method of any of Embodiments 1 to 10, wherein the transmissions on the sidelink data channel and the first and second stages of the two-stage SCI are transmitted at a same power level or at power levels within a configured tolerance.

Embodiment 12: The method of Embodiment 11, further comprising selecting a precoder for the sidelink data channel and the second stage of the two-stage SCI to control the power level.

Embodiment 13: The method of Embodiment 12, wherein the precoder does not directly map an antenna port to a physical antenna when the sidelink data transmission and the second stage of the two-stage SCI are transmitted using a different number of layers.

Embodiment 14: The method of any of Embodiments 1 to 13, wherein: the sidelink data channel is precoded with a precoder, and second stage of the two-stage SCI is precoded using the precoder.

Embodiment 15: The method of any of Embodiments 1 to 14, further comprising: providing an indication or configuration of the precoder used for the sidelink data channel transmission.

Embodiment 16: A method for wireless communications by a user equipment (UE), comprising: receiving one or more demodulation reference signals (DMRS) for a sidelink data channel transmission via a set of one or more antenna ports; receiving a second stage of a two-stage sidelink control information (SCI) transmission using antenna ports from the set of antenna ports; and demodulating the second stage of the two-stage SCI using the one or more DMRS for the sidelink data channel.

Embodiment 17: The method of Embodiment 16, wherein: the sidelink data channel transmission comprises a first physical sidelink shared channel (PSSCH) transmission; and the two-stage SCI comprises a first SCI transmitted on a first physical sidelink control channel (PSCCH) and carrying resource availability information, and a second SCI transmitted on a second PSCCH or on the PSSCH and carrying information to decode a data transmission.

Embodiment 18: The method of Embodiment 17, wherein the first SCI and the second SCI are frequency division multiplexed (FDM) in one or more symbols in a slot.

Embodiment 19: The method of any of Embodiments 16 to 18, wherein receiving the second stage of the two-stage SCI comprises receiving the second stage using one or more lowest index antenna ports of the set of antenna ports used for the sidelink data channel transmission.

Embodiment 20: The method of any of Embodiments 16 to 19, wherein receiving the second stage of the two-stage SCI comprises receiving the second stage using a phase tracking reference signal (PT-RS) antenna port of the set of antenna ports used for the sidelink data channel transmission.

Embodiment 21: The method of any of Embodiments 16 to 20, wherein demodulating the second stage of the two-stage SCI using the one or more DMRS for the sidelink data channel comprises demodulating the second stage of the two-stage SCI using DMRS received before receiving the start of the second stage of the two-stage SCI.

Embodiment 22: The method of any of Embodiments 16 to 21, wherein demodulating the second stage of the two-stage SCI using the one or more DMRS for the sidelink data channel comprises demodulating the second stage of the two-stage SCI using DMRS received up to receiving the end of the second stage of the two-stage SCI.

Embodiment 23: The method of any of Embodiments 16 to 22, wherein demodulating the second stage of the two-stage SCI using the one or more DMRS for the sidelink data channel comprises demodulating the second stage of the two-stage SCI using DMRS received up to the end of a slot in which the second stage of the two-stage SCI is received.

Embodiment 24: The method of any of Embodiments 16 to 23, wherein demodulating the second stage of the two-stage SCI using the one or more DMRS for the sidelink data channel comprises demodulating the second stage of the two-stage SCI using all DRMS received for the PSSCH.

Embodiment 25: The method of any of Embodiments 16 to 24, further comprising flexibly determining the DMRS of the sidelink data channel to use for demodulating the second stage of the two-stage SCI.

Embodiment 26: The method of any of Embodiments 16 to 25, further comprising receiving an explicit indication in a first stage of the SCI of a number of layers of the second stage of the SCI.

Embodiment 27: The method of any of Embodiments 16 to 26, further comprising implicitly determining a number of layers of the second stage of the SCI based on a mapping.

Embodiment 28: The method of any of Embodiments 16 to 27, wherein receiving the second stage of the SCI comprises receiving the second stage of the SCI using a single layer.

Embodiment 29: The method of any of Embodiments 16 to 28, wherein receiving the second stage of the SCI comprises receiving the second stage of the SCI using a number of layers equal to a number of layers used for the sidelink data channel transmission.

Embodiment 30: The method of any of Embodiments 16 to 29, wherein receiving the second stage of the SCI comprises receiving the second stage of the SCI using a configured number of layers.

Embodiment 31: The method of any of Embodiments 16 to 30, wherein the transmissions on the sidelink data channel and the first and second stages of the two-stage SCI are received at a same power level or at power levels within a configured tolerance.

Embodiment 32: The method of any of Embodiments 16 to 31, wherein: the one or more DMRSs comprise DMRSs for a precoded sidelink data channel, and the method further comprises: estimating the channel based on the precoded sidelink data channel transmission, wherein the second stage of the two-stage SCI is demodulated based on the estimation.

Embodiment 33: The method of Embodiment 32, further comprising: receiving an indication or configuration of the precoder used for the sidelink data channel transmission; and estimating the channel based on the indicated or configured precoder.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:

transmitting one or more demodulation reference signals (DMRSs) for a sidelink data channel transmission via a set of one or more antenna ports; and transmitting a second stage of a two-stage sidelink control information (SCI) transmission using antenna ports from the set of one or more antenna ports and using a number of layers equal to a number of layers used for the sidelink data channel transmission.

2. The method of claim 1, wherein the two-stage SCI includes a first SCI in a first stage of the two-stage SCI and a second SCI in the second stage of the two stage SCI, and wherein the first SCI and the second SCI are frequency division multiplexed (FDMed) in one or more symbols in a slot.

3. The method of claim 1, further comprising providing an explicit indication in a first stage of the two-stage SCI of a number of layers of the second stage of the two-stage SCI.

4. The method of claim 1, further comprising implicitly indicating a number of layers of the second stage of the two-stage SCI.

5. The method of claim 1, wherein transmitting the second stage of the two-stage SCI comprises transmitting the second stage of the two-stage SCI using a single layer.

6. The method of claim 1, wherein the transmissions on the sidelink data channel, a first stage of the two-stage SCI, and the second stage of the two-stage SCI are transmitted at a same power level or at power levels within a configured tolerance.

7. The method of claim 6, wherein the same power level or the power levels within a configured tolerance comprise power levels resulting in reception of the sidelink data channel, the first stage of the two-stage SCI, and the second stage of the two-stage SCI at a same received power level or received power levels within the configured tolerance.

8. The method of claim 6, further comprising selecting a precoder for the sidelink data channel and the second stage of the two-stage SCI to control the power level.

9. The method of claim 1, wherein:

the sidelink data channel is precoded with a precoder; and
the method further comprises precoding the second stage of the two-stage SCI transmission using the precoder.

10. A method for wireless communications by a user equipment (UE), comprising:

receiving, on a sidelink channel, one or more demodulation reference signals (DMRSs) for a sidelink data channel transmission via a set of one or more antenna ports;

receiving a second stage of a two-stage sidelink control information (SCI) transmission using antenna ports from the set of one or more antenna ports and using a number of layers equal to a number of layers used for the sidelink data channel transmission; and demodulating the second stage of the two-stage SCI using the one or more DMRSs for the sidelink data channel transmission.

11. The method of claim 10, wherein the two-stage SCI comprises a first SCI in a first stage of the two stage SCI and a second SCI in a second stage of the two-stage SCI, and wherein the first SCI and the second SCI are frequency division multiplexed (FDMed) in one or more symbols in a slot.

12. The method of claim 10, wherein demodulating the second stage of the two-stage SCI using the one or more DMRSs for the sidelink data channel comprises demodulating the second stage of the two-stage SCI using DMRSs received up to receiving an end of the second stage of the two-stage SCI.

13. The method of claim 10, wherein demodulating the second stage of the two-stage SCI using the one or more DMRSs for the sidelink data channel comprises demodulating the second stage of the two-stage SCI using DMRSs received up to an end of a slot in which the second stage of the two-stage SCI is received.

14. The method of claim 10, further comprising flexibly determining the one or more DMRSs of the sidelink data channel to use for demodulating the second stage of the two-stage SCI.

15. The method of claim 10, further comprising receiving an explicit indication in a first stage of the two-stage SCI of a number of layers used for the second stage of the two-stage SCI.

16. The method of claim 10, wherein receiving the second stage of the two-stage SCI comprises receiving the second stage of the two-stage SCI using a single layer.

17. The method of claim 10, wherein the transmissions on the sidelink data channel, a first stage of the two-stage SCI, and the second stage of the two-stage SCI are received at a same power level or at power levels within a configured tolerance.

18. The method of claim 10, wherein:

the one or more DMRSs comprise DMRSs for a precoded sidelink data channel transmission; and
the method further comprises estimating the channel based on the DMRSs for the precoded sidelink data channel transmission, wherein the second stage of the two-stage SCI is demodulated based on the estimation.

19. An apparatus for wireless communications by a user equipment (UE), comprising:

at least one memory; and
one or more processors coupled with the at least one memory and configured to cause the apparatus to:

transmit one or more demodulation reference signals (DMRSs) for a sidelink data channel transmission via a set of one or more antenna ports, and transmit a second stage of a two-stage sidelink control information (SCI) transmission using antenna ports from the set of one or more antenna ports and using a number of layers equal to a number of layers used for the sidelink data channel transmission.

20. The apparatus of claim 19, wherein the one or more processors are configured to cause the transmissions on the sidelink data channel, a first stage of the two-stage SCI, and the second stage of the two-stage SCI to be transmitted at a same power level or at power levels within a configured tolerance.

21. The apparatus of claim 20, wherein the same power level or the power levels within a configured tolerance comprise power levels resulting in reception of the sidelink data channel, the first stage of the two-stage SCI, and the second stage of the two-stage SCI at a same received power level or received power levels within the configured tolerance.

22. The apparatus of claim 20, wherein the one or more processors are further configured to cause the apparatus to select a precoder for the sidelink data channel and the second stage of the two-stage SCI to control the power level.

23. An apparatus for wireless communications by a user equipment (UE), comprising:

at least one memory; and
one or more processors coupled with the at least one memory and configured to cause the apparatus to:

receive, on a sidelink channel, one or more demodulation reference signals (DMRSs) for a sidelink data channel transmission via a set of one or more antenna ports;

receive a second stage of a two-stage sidelink control information (SCI) transmission using antenna ports from the set of antenna ports and using a number of layers equal to a number of layers used for the sidelink data channel transmission; and demodulate the second stage of the two-stage SCI using the one or more DMRSs for the sidelink data channel transmission.

24. The apparatus of claim 23, wherein the one or more processors are configured to cause the apparatus to demodulate the second stage of the two-stage SCI using DMRSs received up to receiving an end of the second stage of the two-stage SCI.

25. The apparatus of claim 23, wherein the one or more processors are configured to cause the apparatus to demodulate the second stage of the two-stage SCI using DMRSs received up to an end of a slot in which the second stage of the two-stage SCI is received.

26. The apparatus of claim 23, wherein one or more processors are configured to cause the apparatus to receive the transmissions on the sidelink data channel, a first stage of the two-stage SCI, and the second stage of the two-stage SCI at a same power level or at power levels within a configured tolerance.

* * * * *